(12) United States Patent
Tyson et al.

(10) Patent No.: US 9,388,316 B2
(45) Date of Patent: Jul. 12, 2016

(54) FOULING-RESISTANT COMPOSITION COMPRISING STEROLS AND/OR DERIVATIVES THEREOF

(75) Inventors: Brent Vickers Tyson, Newcastle-upon-Tyne (GB); Kevin John Reynolds, Gateshead (GB)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 14/238,985

(22) PCT Filed: Aug. 15, 2012

(86) PCT No.: PCT/EP2012/065920
§ 371 (c)(1),
(2), (4) Date: Feb. 14, 2014

(87) PCT Pub. No.: WO2013/024106
PCT Pub. Date: Feb. 21, 2013

(65) Prior Publication Data
US 2014/0155530 A1 Jun. 5, 2014

Related U.S. Application Data

(60) Provisional application No. 61/524,990, filed on Aug. 18, 2011, provisional application No. 61/525,016, filed on Aug. 18, 2011.

(30) Foreign Application Priority Data

Aug. 18, 2011 (EP) .................................. 11177897
Aug. 18, 2011 (EP) .................................. 11177899

(51) Int. Cl.
C09D 5/16 (2006.01)

(52) U.S. Cl.
CPC ............ *C09D 5/1675* (2013.01); *C09D 5/1625* (2013.01); *C09D 5/1687* (2013.01)

(58) Field of Classification Search
None
See application file for complete search history.

(56) References Cited

U.S. PATENT DOCUMENTS

| | | | |
|---|---|---|---|
| 1,960,252 A | 5/1934 | Mano | |
| 3,702,778 A | 11/1972 | Mueller et al. | |
| 6,653,378 B2 * | 11/2003 | Ferritto et al. | 524/267 |
| 7,875,699 B2 * | 1/2011 | Ando et al. | 528/503 |
| 2004/0228821 A1 * | 11/2004 | Sunkel | A61K 8/042 424/70.12 |
| 2008/0107679 A1 * | 5/2008 | Dilallo | A61K 8/64 424/195.17 |
| 2009/0197003 A1 | 8/2009 | Shira | |

FOREIGN PATENT DOCUMENTS

| | | |
|---|---|---|
| EP | 0 767 223 | 4/1997 |
| EP | 0 874 032 | 10/1998 |
| GB | 1 307 001 | 2/1973 |
| JP | 2005-263975 | 9/2005 |
| JP | 2010-90246 | 4/2010 |
| KR | 2009068485 | 6/2009 |
| WO | 99/33927 | 7/1999 |
| WO | 01/94487 | 12/2001 |
| WO | 02/074870 | 9/2002 |
| WO | 2004/085552 | 10/2004 |
| WO | WO 2007/058386 * | 5/2007 |
| WO | 2007/122325 | 11/2007 |
| WO | 2008/055985 | 5/2008 |
| WO | 2008/132196 | 11/2008 |
| WO | 2009/103894 | 8/2009 |
| WO | 2009/106717 | 9/2009 |
| WO | 2009/106718 | 9/2009 |
| WO | 2009/106719 | 9/2009 |
| WO | 2009/106720 | 9/2009 |
| WO | 2009/106721 | 9/2009 |
| WO | 2009/106722 | 9/2009 |
| WO | 2009/106723 | 9/2009 |
| WO | 2009/106724 | 9/2009 |
| WO | 2009/118307 | 10/2009 |
| WO | 2009/133084 | 11/2009 |
| WO | 2009/133085 | 11/2009 |
| WO | 2009/156608 | 12/2009 |
| WO | 2009/156609 | 12/2009 |
| WO | 2010/103209 | 9/2010 |
| WO | 2013/024106 | 2/2013 |

OTHER PUBLICATIONS machine-generated translation of JP 2005-263975 (Sep. 2005).*
European Search Report for EP Application No. 11177899.9, dated Nov. 9, 2011.
International Search Report for International Application No. PCT/EP2012/065920, dated Dec. 20, 2012.

* cited by examiner

*Primary Examiner* — Marc Zimmer
(74) *Attorney, Agent, or Firm* — Kenyon & Kenyon LLP

(57) ABSTRACT

The present invention provides a fouling-resistant composition which comprises an elastomer and a component comprising sterol(s) and/or sterol derivative(s), wherein the component is selected from acylated lanolin, alkoxylated lanolin, or lanolin oil, or a composition comprising at least 20 weight % of one or more sterol(s), at least 20 weight % of one or more $C_1$-$C_{12}$ sterol ester(s), or at least 20 weight % of alkoxylated sterol(s), wherein weight % is the percentage of the sterol or sterol derivative to the total weight of the component.

13 Claims, 1 Drawing Sheet

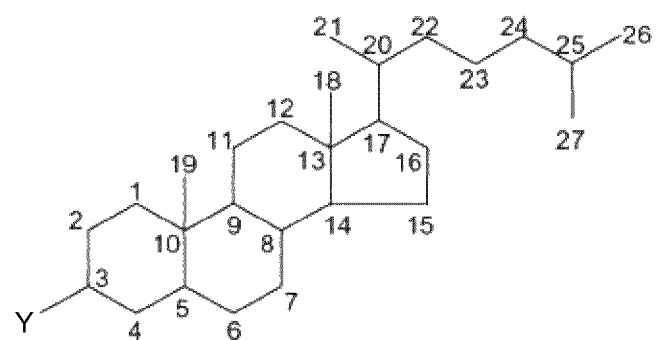

FOULING-RESISTANT COMPOSITION COMPRISING STEROLS AND/OR DERIVATIVES THEREOF

REFERENCE TO RELATED APPLICATIONS

This application is the U.S. National Phase of PCT/EP2012/065920, filed on Aug. 15, 2012, and claims the benefit of EP Application No. 11177897.3, filed on Aug. 18, 2011, EP Application No. 11177899.9, filed on Aug. 18, 2011, U.S. Application No. 61/524,990, filed on Aug. 18, 2011, and U.S. Application No. 61/525,016, filed on Aug. 18, 2011.

The invention relates to a fouling-resistant composition, the use of the fouling-resistant composition in an aquatic environment, a method for inhibiting fouling in aquatic environment, and to a substrate coated with the fouling-resistant composition.

Man-made structures such as boat hulls, buoys, drilling platforms, dry dock equipment, oil production rigs, aquaculture equipment and netting and pipes which are immersed in water are prone to fouling by aquatic organisms such as green and brown algae, barnacles, mussels, and the like. Such structures are commonly of metal, but may also comprise other structural materials such as concrete. This fouling is a nuisance on boat hulls, because it increases frictional resistance during movement through the water, the consequence being reduced speeds and increased fuel costs. It is a nuisance on static structures such as the legs of drilling platforms and oil and gas production, refining and storage rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow rates are reduced.

The commercially most successful methods of inhibiting fouling have involved the use of anti-fouling coatings containing substances toxic to aquatic life, for example tributyltin chloride or cuprous oxide. Such coatings, however, are being regarded with increasing disfavor because of the damaging effects such toxins may have if released into the aquatic environment. There is accordingly a need for non-fouling coatings, which do not release markedly toxic materials.

It has been known for many years, for example as disclosed in GB 1,307,001 and U.S. Pat. No. 3,702,778 that silicone rubber coatings resist fouling by aquatic organisms. It is believed that such coatings present a surface to which the organisms cannot easily adhere, and they can accordingly be called fouling-release or fouling-resistant rather than anti-fouling coatings. Silicone rubbers and silicone compounds generally have very low toxicity. The disadvantage of this anti-fouling system when applied to boat hulls is that although accumulation of marine organisms is reduced, there is the need for relatively high vessel speeds to remove all fouling species. Thus, in some instances, it has been shown that for effective release from a hull that has been treated with such a polymer it is necessary to sail with a speed of at least 14 knots. For this reason silicone rubbers have gained limited commercial success and there is a need for improvement of anti-fouling and fouling-release properties of these environmentally benign coatings.

WO 02/074870 describes an alternative fouling-resistant composition which has low surface energy and suitable elastomeric properties. This anti-fouling composition comprises a cured or crosslinked polymer, which is free from perfluoropolyether moieties, and a fluorinated alkyl- or alkoxy-containing polymer or oligomer. It was found that this fouling-resistant composition was superior to other known fouling-resistant compositions due to a decrease in the settlement of fouling organisms and their adhesion strengths.

It has now been found that a fouling-resistant composition comprising an elastomer and a component comprising sterol(s) and/or sterol derivative(s), wherein the component is selected from acylated lanolin, alkoxylated lanolin, lanolin oil, or a composition comprising at least 20 weight % of one or more sterol(s), at least 20 weight % of one or more $C_1$-$C_{12}$ sterol ester(s), or at least 20 weight % of alkoxylated sterol(s), wherein weight % is the percentage of the sterol or sterol derivative to the total weight of the component, has excellent fouling-resistant properties.

The compositions of the present invention have been found to have fouling resistance properties superior to compositions in WO 02/074870.

Fouling-resistant properties can be compared by measuring the amount of settlement of fouling organisms and their adhesion strengths.

Unmodified lanolin is an example of natural product which comprises one or more sterol(s), and sterol derivatives, but is not a component of the fouling-resistant composition of the present invention. This is because it is not acylated, alkoxylated, or an oil, and it does not comprise more than 20 weight % of sterol(s), more than 20 weight % of sterol(s) $C_1$-$C_{12}$ sterol ester(s), or more than 20 weight % of sterol(s) alkoxylated sterol(s), based on the total weight of the unmodified lanolin. Commercially available lanolin typically comprises around 97% by weight of long chain fatty esters. The majority of these esters (>90%) have aliphatic tails longer than 12 carbons. The sterol content in lanolin has been found to be present in unmodified lanolin at the most, at around 5 weight %. Unmodified lanolin contains even less alkoxylated sterols.

The inventors have found that a fouling resistant composition comprising lanolin which has been modified by acylation, alkoxylation, or lanolin oil (sometimes called "liquid lanolin"), in combination with an elastomer, has superior fouling-resistant properties compared to if unmodified lanolin is used in the same composition.

Superior fouling-resistant properties are also found when the fouling resistant composition comprises an elastomer, and a component comprising at least 20 weight % of sterols, acylated or alkoxylated derivatives thereof, wherein weight % is the percentage of the sterol or sterol derivative to the total weight of the component. It is therefore not necessary to derive the sterols or sterol derivatives from modified lanolin, but they can be derived from other sources that comprise this amount of sterols, acylated or alkoxylated derivatives thereof.

WO2004/0585552, KR2009068485, U.S. Pat. No. 1,960,252 and US2009/0197003 disclose a variety of antifouling compositions and mention that lanolin (unmodified) may be used in the antifouling compositions, as one of a large number of alternative additives. None of these documents teach or motivate the reader to select lanolin from these long lists of additives, let alone to modify the lanolin before using in the antifouling composition.

Japanese patent application JP2005263975A discloses antifouling paint compositions comprising lanolin or a lanolin derivative. It discloses a long list of resins that must be used to prepare the antifouling paint, but fails to teach the synergistic effect on the fouling resistance when certain lanolin derivatives are combined with an elastomer to prepare a fouling resistant coating composition. In fact, JP2005263975 directs the reader to prepare antifouling coating compositions comprising a harder, non-elastomeric polymer—an acrylate resin. Further, JP2005263975 teaches that acrylate resins should be combined with polybutene. The polybutene is added to raise the plasticity of the paint film.

Surprisingly, the present inventors have found that coatings of the fouling-resistant compositions of the present invention which comprises a "softer" elastomer, and specific lanolin derivatives have superior fouling-resistant properties against a wide range of fouling (slime fouling, weed fouling, soft fouling and hard fouling), compared to the deliberately-designed harder and non-elastomer coatings suggested and exemplified in JP2005263975.

Japanese patent application JP2010090246A discloses biocide-free antifouling paint compositions comprising lanolin or a lanolin derivative. It teaches that the antifouling paint must comprise a thermoplastic resin, and that the thermoplastic resin is required to strengthen the hardness of the paint. A large number of thermoplastic resins are disclosed, and the coating compositions of the examples comprise thermoplastic petroleum resin. So like JP2005263975A, JP2010090246A also teaches the use of a "hard" resin, instead of a "softer" elastomer resin as required by the composition of the present invention. Surprisingly, the fouling resistant compositions of the present invention have been found to result in coatings which have superior fouling-resistant properties against a wide range of fouling (slime fouling, weed fouling, soft fouling and hard fouling) compared to the deliberately-designed harder coatings suggested and exemplified in JP2010090246A.

One advantage of the new fouling-resistant compositions disclosed herein is that since lanolin/sterol(s) and sterol derivative(s) are biodegradable, the use of these in fouling resistant compositions would be expected to have little (if any) environmental impact on the marine and aquatic environment.

Surprisingly, the foul-release coating compositions of this invention have been shown to have effective release of fouling at low speeds, at for example, between 0 and 12 knots.

One aspect of the invention relates to a fouling-resistant composition which comprises an elastomer and a component comprising sterol(s) and/or sterol derivative(s), wherein the component is selected from acylated lanolin, alkoxylated lanolin, lanolin oil, or a composition comprising at least 20 weight % of one or more sterol(s), at least 20 weight % of one or more $C_1$-$C_{12}$ sterol ester(s), or at least 20 weight % of alkoxylated sterol(s), wherein weight % is the percentage of the sterol or sterol derivative to the total weight of the component.

Sterols and sterol esters are triterpenoids, which is a class of organic molecule derived from triterpene molecules. It is known in the art that sterols and sterol derivatives have the skelton carbon structure as shown in FIG. 1.

The sterol carbon skeleton shown in FIG. 1 may be fully saturated, or may contain ethylenically unsaturated double bonds. For example, cholesterol has an ethylenically unsaturated double bond between Carbons 5 and 6. The sterol skeleton also contains a number of chiral carbons; therefore different isomeric forms of sterols exist.

Sterols and sterol derivatives may be derived from natural sources, such as animals and plants. Examples of sterols include: cholesterol, lanosterol, agnosterol, 7-dehydrocholesterol, cholecalciferol, desmosterol, lathosterol, cholestanol, coprastanol, campesterol, stigmasterol, sitosterol, avenasterol, stigmastenol, brassicasterol, 4-desmethyl sterols (i.e. with no substituent on carbon-4), 4α-monomethyl sterols and 4,4-dimethyl sterols, phytostanols (fully saturated), ergosterol, amyrin and cylcoartenol.

Examples of seed oils comprising sterols and sterol derivatives include evening primrose oil, avocado oil, rapeseed oil, canola oil, corn oil, peanut oil, sunflower oil, borage oil, olive oil, sesame oil, coconut oil, cottonseed oil, safflower oil, palm oil, walnut oil, pecan oil, almond oil and soybean oil. The component used in the fouling-resistant composition may therefore be derived from seed oils, for example those noted above. However, in order for the seed oil to comprise the required amount of sterols, sterol esters or alkoxylated sterols, it may be necessary to modify the seed oil by hydrolysis (to increase the amount of sterol), acylation (to increase the amount of sterol ester) or alkoxylation (to increase the amount of alkoxylated sterol) in the composition. The component may therefore comprise seed oils which have been hydrolyzed, acylated or alkoxylated.

In one embodiment of the invention, the component comprises sterols and/or sterol derivatives represented by FIG. 1, wherein Y is selected from —OH (sterol), —O—(CO)$R^3$ (sterol ester), or —O—$R^4$—(O$R^5$)$_x$O$R^6$ (alkoxylated sterol), wherein $R^3$ is an branched or linear alkyl comprising between 1 and 12 carbon atoms, and $R^4$ and $R^5$ are independently $C_{2-6}$ alkylene, $R^6$ is hydrogen or $C_{1-4}$ primary or secondary alkyl group, X is an integer ranging from 1 to 100.

When Y is $R^3$(CO)O— and $R^3$ is an alkyl moiety comprises between 1 and 12 carbon atoms, the sterol esters is known herein as a $C_1$-$C_{12}$-acylated sterol ester.

Preferably, $R^3$, is a linear alkyl moiety. Preferably, $R^3$ is an alkyl radical comprising between 1 and 5 carbon atoms (herein referred to as "$C_1$-$C_5$ acylated sterol ester(s)"), or between 1 and 3 carbon atoms (herein referred to "$C_1$-$C_3$ acylated sterol ester(s)"). Most preferably $R^3$ comprises 1 carbon atom and is a $CH_3$— radical. If $R^3$ is a $CH_3$-radical, the sterol ester is referred herein as an acetylated sterol ester.

Preferably, $R^4$ and $R^5$ are ethylene.

Preferably $R^6$ is hydrogen or methyl.

Preferably X is an integer ranging from 1 to 80, more preferably 1 to 50, even more preferably 1 to 30, and most preferably 1-15.

The component may comprise one or more sterols. The component comprising one or more sterols may comprise at least 30 percent by weight, at least 40 percent by weight, at least 50 percent by weight, at least 60 percent by weight, at least 70 percent by weight, at least 80 percent by weight, or at least 90 percent by weight, of the one or more sterols, wherein weight % is the percentage of the sterol to the total weight of the component.

The component may comprise one or more sterol esters. The component comprising one or more sterol esters may comprise at least 30 percent by weight, at least 40 percent by weight, at least 50 percent by weight, at least 60 percent by weight, at least 70 percent by weight, at least 80 percent by weight, or at least 90 percent by weight, of the one or more sterol esters, wherein weight % is the percentage of the sterol ester to the total weight of the component.

The one or more $C_1$-$C_{12}$ sterol ester(s) in the component of the fouling resistant composition may be one or more of $C_1$-$C_5$ acylated sterol ester(s), even more preferably one or more $C_1$-$C_3$ acylated sterol ester(s), and most preferably acetylated sterol ester(s).

The component may be acylated lanolin. In some embodiments, the acylated lanolin may be $C_1$-$C_{12}$ acylated lanolin, for example $C_1$-$C_5$ acylated lanolin and most preferably acetylated lanolin. The acetylated lanolin may be further modified to be in the form of a oil (for example, by fractional crystallization).

Compositions comprising sterols and/or sterol derivatives, such as lanolin, may be acylated to prepare the component to use in the fouling resistant composition. The compositions may be acylated directly (in a one-step reaction) by mixing it with an acylating agent (an acid or an acid chloride/anhydride), or may first be hydrolyzed, and then the subsequent alcohols formed can then be acylated with the acylating agent (two-step reaction). In both reactions, the free hydroxyl groups that are present in the composition (for example the hydroxyl group on the sterol), will be partially or fully converted to acyl ester groups. In addition, the existing ester groups (for example sterol esters of long chain fatty acids, which are present in abundance in lanolin) will be partially or fully converted into the same acyl group of the acylating agent. For example, if lanolin is acetylated with acetyl chloride or acetyl anhydride, both the free sterols and a large proportion of the long-chain fatty sterol esters will become acetylated sterol esters.

It will be apparent to the skilled person that the alkyl chain length of the acyl ester depends on the acylating agent used. For example, an acylating agent having an acyl group comprising 5 carbons ("a $C_5$-acylating agent") can be used to prepare a $C_5$-acylated sterol ester.

Acetylated lanolin may be commercially sourced, for example: Acetylated Lanolin Standard (NK Chemicals), Acylan (Croda), Modulan (Lubrizol), YOFCO AC-25 (Nipon Fine Chemical Co.), RolanACE (Rolex Lanolin Products Limited) and Acetylated Lanolin (Wujiang Xinyi Chemical Co.).

The component may comprise alkoxylated sterol(s). The component comprising alkoxylated sterol(s) may comprise at least 30 percent by weight, at least 40 percent by weight, at least 50 percent by weight, at least 60 percent by weight, at least 70 percent by weight, at least 80 percent by weight, or at least 90 percent by weight, of the one or more alkoxylated sterol(s), wherein weight % is the percentage of the sterol to the total weight of the component.

The alkoxylated sterols may be ethoxylated sterols. In one embodiment, the ethoxylated sterol have the structure in FIG. 1 wherein Y is —O—$R^4$—$(OR^5)_xOR^6$, and $R^4$ and $R^5$ are both ethylene. Preferably, R6 is hydrogen or $C_{1-4}$ primary or secondary alkyl group, such as a methyl.

The component may be alkoxylated lanolin. Preferably, the number of alkylene oxide units in the polyalkylene oxide chain varies between 1-100, for example 1-80, more preferably 1-50, more preferably 1-30, and most preferably 1-15. The alkoxylated lanolin may be ethoxylated lanolin, comprising a polyethylene oxide chains. The ethoxylated lanolin may have a molecular weight (MW) ranging between 800-4500 Daltons.

The ethoxylated lanolin may be optionally dissolved in an aqueous medium or an organic medium, such as xylene, trimethylbenzene, butanol, methyl isobutyl ketone and methyl isopentyl ketone.

Ethoxylated lanolin may be commercially sourced, for example from NK Chemicals (PEG-30 Lanolin).

The component may be lanolin oil ("liquid lanolin"). Lanolin oil can be prepared by fractional crystallization. When lanolin is modified by fractional crystallization, the lower molecular weight components are collected in liquid form. The higher molecular weight components form a solid; this is collectively known as lanolin wax. The average molecular weight of the liquid fraction is dependent on the solvent employed in the fractional crystallization process. For example, when isopropanol is used for extraction the mean molecular weight is approximately 360.

By liquid we mean a liquid material defined in conformity with ASTM (1996) D4359-90: Standard Test Method for Determining Whether a Material is a Liquid or a Solid, except that the test is carried out at 15° C. and not 38° C. as specified in the ASTM test method. To test whether the component comprising one or more sterol(s) and/or ester(s) thereof, the component under test is held in a tightly closed can at 15° C. The lid is removed and the can inverted. The flow of the material from the can is observed to determine whether it is solid or a liquid. A material that flows for a total of 50 mm or less within 3 minutes is considered a solid. Otherwise it is considered a liquid.

Lanolin oil may be commercially sourced, for example, Fluilan (Croda). EWALAN FL-50 (H. Erhard Wagner GmbH), Lanogene (Lubrizol), YOFCO Liquid Lanolin (Nipon Fine Chemical Co.), Liquid Lanolin Standard (NK Chemicals) and RolanOIL (Rolex Lanolin Products Limited).

The component may comprise one or more of the following: cholesterol, lanosterol, agnosterol and dihydrolanesterol, cycloartenol, camposterol, sigmasterol, sitosterol, amyrin and/or esters or alkoxylated derivatives thereof. Preferably, the component comprises cholesterol or lanosterol and/or the esters or alkoxylated derivatives thereof, for example cholesterol acetate.

In one embodiment, the component may comprise a pure or substantially pure sterol or an acylated or alkoxylated derivative thereof. The component may be a pure or substantially pure sterol ester derivative or pure or substantially pure alkoxylated sterol derivative, for example as sterol ester/alkoxyated sterol derivative of one of the following sterols: cholesterol, lanosterol, cycloartenol, campesterol, sitosterol, stigmasterol, amyrin or agnosterol. It is not essential to derive the sterol or derivative thereof from lanolin. For example, the sterol or sterol derivatives may be derived from the seed oils noted above or other plant or animal sources.

By substantially pure, we mean that the component comprises at least 70% by weight, preferably at least 80% by weight and more preferably at least 90% by weight of the component is a sterol or the acylated/alkoxylated derivative thereof, wherein weight % is the percentage of the sterol/sterol derivative to the total weight of the component.

In particular, the present inventors have found compositions comprising pure and substantially pure sterol esters for example as sterol esters of one of the following sterols: cholesterol, lanosterol cycloartenol, campesterol, sitosterol, stigmasterol, amyrin or agnosterol (and in particular sterol acetates), when used as the component in the fouling-resistant coating compositions, surprisingly have excellent fouling-resistance performance compared to other known fouling resistant compositions.

If the component is a modified-form of lanolin, it is preferred that it is anhydrous. By anhydrous we mean that the lanolin contains less than 1%, 0.5% or 0.2% weight of water.

In all embodiments of the invention, the weight ratio of the component to the polymer in the fouling-resistant composition may be about 1-30%, preferably 1-10%.

The coating composition used to prepare the coating of the present invention may comprise one or more polymer(s) which form(s) an "elastomer" when dried, cured or crosslinked. These polymers are referred to herein as "elastomers"

By an "elastomer", we mean polymer(s) which are dryable, curable or crosslinkable, and when dried, cured or crosslinked, are a rubber-like materials exhibiting little plastic flow and quick and nearly complete recovery from an extending force. When tested at room temperature (25° C.) the dried, cured or crosslinked polymer(s) are capable of being stretched 25% (strain rate 30 mm/minute) and after being stretched 25%, held for 5 minutes and then released, is capable of retracting to within 10% of its original length within 5 minutes after release. Elongation measurements can be carried out using a Zwick tensile test machine and laser extensometer in compliance with ASTM D638-10. Free films for testing should have sample dimensions 90×15×0.5 mm, prepared by the procedure given in section 8.2.2 of ASTM D2370-98.

In all embodiments, the elastomer is preferably one or a mixture of organosiloxane polymer(s).

Organosilanes (which are sometimes referred to in the art as organosiloxane-containing polymer(s)) are an elastomers within the context of this invention. Preferably the polyorganosiloxane has one or more, more preferably two or more reactive functional groups such as hydroxyl, alkoxy, acetoxy, carboxyl, hydrosilyl, amine, epoxy, vinyl or oxime functional groups.

The organosiloxane-containing polymer may comprise a repeating unit of the general structure —[$SiR^1R^2$—O]— wherein $R^1$ and $R^2$ are independently selected from hydrogen, alkyl, aryl, aralkyl, and a vinyl containing moiety. Preferably $R^1$ and $R^2$ are independently selected from an alkyl selected from $C_1$-$C_6$ alkyl, a phenyl, a $C_1$-$C_6$ alkylphenyl or a $C_1$-$C_6$ alkylene.

$R^1$ and $R^2$ may be independently selected from methyl and phenyl. Alternatively, the organosiloxane-containing polymer is a polymer wherein $R^1$ and $R^2$ are both methyl.

For instance condensation curable polydimethylsiloxanes (di-hydroxy-functional) could be used, which are crosslinked with tetraethyl orthosilicate (dibutyltin dilaurate catalyzed).

A preferred polymer contains siloxane groups which is substantially free of carbon in the backbone. e.g. polydimethylsiloxane (wherein substantially free of carbon means that less than 1 wt. % of carbon is present). Other suitable polymers are those as disclosed in WO 99/33927, particularly the polymers disclosed on page 12, lines 23-31, viz. an organohydrogenpolysiloxane or a polydiorganosiloxane. The polysiloxane may, for example, comprise a copolymer of diorganosiloxane units with organohydrogen siloxane units and/or with other diorganosiloxane units, or a homopolymer or organohydrogen siloxane units or of diorganosiloxane units.

Polysiloxanes that can be crosslinked by a hydrosilylation reaction can also be used. Such polymers are known as 'hydride silicone' and are disclosed, for instance, in EP 874032-A2 on page 3, viz. a polydiorganosiloxane of the formula R'—(SiOR'$_2$)—SiR'$_3$, wherein each R' is independently a hydrocarbon or fluorinated hydrocarbon radical, at least two R' radicals per molecule being unsaturated, or hydrogen, at least two R' radicals per molecule being hydrogen, and m has an average value in the range of about 10-1, 500. Cyclic polydiorganosiloxanes analogous to those of formula above may also be employed. The hydride silicone is preferably a hydrogen polydimethylsiloxane.

Furthermore, the polyorganosiloxane may also comprise two or more polyorganosiloxanes of different viscosity.

Alternatively, elastomer may be the polymer as described in WO2008132196, wherein the polymer is a polyorganosiloxane polyoxyalkylene block copolymer of the form PS-(A-PO-A-PS)n, wherein PS represents a polyorganosiloxane block, PO represents a polyoxyalkylene block, A represents a divalent moiety, and n has a value of at least 1.

The polymer has two or three reactive groups X on a polyorganosiloxane block per molecule which may self-condense and crosslink in the presence or absence of a catalyst which can, optionally, be crosslinked with another organosilicon crosslinking agent containing two or more groups Y which are reactive with the said groups X.

Preferably the polyorganosiloxane(s) polymer(s) is(are) present in an amount of 30 to 90 wt %, based on the total weight of the coating composition.

Preferably the polymer is crosslinkable. Depending on the type of crosslinkable polymer, the coating composition may require a crosslinker.

The elastomer may also comprise resins that are considered to be non-elastomers, provided that the relative proportions of elastomer resin to non-elastomer resin is such that when dried, cured or crosslinked, the dried/cured/crosslinked mixture of elastomer and non-elastomer resins fulfils the requirements for being an "elastomer" according to the above-noted test.

Examples of non elastomer and elastomer resins include: acrylonitrile butadiene styrene, acrylic, methacrylic, acetate, fluoroplastic, polyacrylonitrile, polyamide, polyaryletherketone, polybutadiene, polybutylene, polyterephthalate, polycaprolactone, polychlorotrifluoroethylene, polycarbonate, polyketone, polyester, polyethylene, polyetheretherketone, polyetherketoneketone, polyetherimide, polyethersulfone, polyimide, polylactic acid, polypropylene, polystyrene, polysulfone, polyurethane, polyvinyl acetate, polyvinyl chloride, polyvinylidene chloride, styrene-acrylonitrile, polyisoprene, polyisobutylene, butyl rubber, halogenated butyl rubber, styrene-butadiene rubber, nitrile rubber, hydrogenated nitrile rubber, ethylene propylene rubber, ethylene propylene diene rubber, organopolysiloxane resin, fluorosilicone, fluoroelastomer, perfluoroelastomer, polyether block amide, chlorosulfonated polyethylene or ethylene-vinyl acetate resin.

The coating composition may also comprise fillers.

Examples of suitable fillers are barium sulphate, calcium sulphate, calcium carbonate, silicas or silicates (such as talc, feldspar, and china clay), including pyrogenic silica, bentonite and other clays, and solid silicone resins, which are generally condensed branched polysiloxanes, such as a silicone resin comprising Q units of the formula $SiO_{4/2}$ and M units of the formula $R'''_3SiO_{1/2}$, wherein the $R'''$ substituents are selected from alkyl groups having 1 to 6 carbon atoms and the ratio of M units to Q units is in the range of 0.4:1 to 1:1. Some fillers such as fumed silica may have a thixotropic effect on the coating composition. The proportion of fillers may be in the range of from 0 to 25 wt %, based on the total weight of the coating composition. Preferably the clay is present in an amount of 0 to 1 wt % and preferably the thixotrope is present in an amount of 0 to 5 wt %, based on the total weight of the coating composition.

The coating composition may comprise pigments.

Examples of pigments include black iron oxide, red iron oxide, yellow, iron oxide, titanium dioxide, zinc oxide, carbon black, graphite, red molybdate, yellow molybdate, zinc sulfide, antimony oxide, sodium aluminium sulfosilicates, quinacridones, phthalocyanine blue, phthalocyanine green, black iron oxide, indanthrone blue, cobalt aluminium oxide, carbazoledioxazine, chromium oxide, isoindoline orange, bis-acetoaceto-tolidiole, benzimidazolone, quinaphthalone yellow, isoindoline yellow, tetrachloroisoindolinone, and quinophthalone yellow, metallic flake materials (e.g. aluminium flakes), or other so-called barrier pigments or anti-corrosive pigments such as zinc dust or zinc alloys. The pigment volume concentration preferably is in the range of 0.5-25%. The proportion of pigments may be in the range of from 0 to 25 wt %, based on the total weight of the coating composition.

Where the elastomer is crosslinkable, the composition may comprise a catalyst.

Examples of catalysts that may be used include the carboxylic acid salts of various metals, such as tin, zinc, iron, lead, barium, and zirconium. The salts preferably are salts of long-chain carboxylic acids, for example dibutyltin dilaurate, dibutyltin dioctoate, iron stearate, tin (II) octoate, and lead octoate. Further examples of suitable catalysts include organobismuth and organotitanium compounds and organo-phosphates such as bis(2-ethyl-hexyl) hydrogen phosphate. Other possible catalysts include chelates, for example dibutyltin acetoacetonate. Further, the catalyst may comprise a halogenated organic acid, which has at least one halogen substituent on a carbon atom which is in α-position relative to the acid group and/or at least one halogen substituent on a carbon atom which is in β-position relative to the acid group, or a derivative which is hydrolysable to form such an acid under the conditions of the condensation reaction. Alternatively, the catalyst may be as described in any of:

WO2007122325A1, WO2008055985A1,
WO2009106717A2, WO2009106718A2,
WO2009106719A1, WO2009106720A1,
WO2009106721A1 WO2009106722A1,
WO2009106723A1, WO2009106724A1,
WO2009103894A1, WO2009118307A1,
WO2009133084A1, WO2009133085A1,
WO2009156608A2, and WO2009156609A2.

Preferably the catalyst is present in an amount of 0.05 to 4 wt % based on the total weight of the coating composition.

Where the elastomer is crosslinkable, the composition may comprise a crosslinker.

The crosslinker that is optionally present can be a crosslinking agent comprising a functional silane and/or one or more of any of acetoxy, alkoxy, amido, alkenoxy and oxime groups, preferably one or more oxime groups. Examples of such crosslinking agents are presented in WO99/33927. Mixtures of different crosslinkers can also be used.

Suitable solvents for use in the fouling resistant coating composition include aromatic hydrocarbons, alcohols, ketones, esters, and mixtures of the above with one another or an aliphatic hydrocarbon. Preferable solvents include ketones such as methyl isopentyl ketone and/or xylene.

In a preferred embodiment, the fouling-resistant composition of the present invention may be free or substantially free of biocide. Surprisingly, the inventors have found that the fouling-resistant compositions of the present invention which do not comprise biocides have superior anti-fouling performance compared to a commercially leading biocide-free fouling-resistant coating comprising a flouro-polymer as described in WO 02/074870.

Alternatively, the fouling-resistant composition of the present invention may comprise one or more biocide(s).

The biocide may be one or more of an inorganic, organometallic, metal-organic or organic biocide for marine or freshwater organisms. Examples of inorganic biocides include copper salts such as copper oxide, copper thiocyanate, copper bronze, copper carbonate, copper chloride, copper nickel alloys, and silver salts such as silver chloride or nitrate; organometallic and metal-organic biocides include zinc pyrithione (the zinc salt of 2-pyridinethiol-1-oxide), copper pyrithione, bis(N-cyclohexyl-diazenium dioxy) copper, zinc ethylene-bis(dithiocarbamate) (i.e. zineb), zinc dimethyl dithiocarbamate (ziram), and manganese ethylene-bis(dithiocarbamate) complexed with zinc salt (i.e. mancozeb); and organic biocides include formaldehyde, dodecylguanidine monohydrochloride, thiabendazole, N-trihalomethyl thiophthalimides, trihalomethyl thiosulphamides, N-aryl maleimides such as N-(2,4,6-trichlorophenyl) maleimide, 3-(3,4-dichlorophenyl)-1,1-dimethylurea (diuron), 2,3,5,6-tetrachloro-4-(methylsulphonyl) pyridine, 2-methylthio-4-butylamino-6-cyclopopylamino-s-triazine, 3-benzo[b]thienyl-5,6-dihydro-1,4,2-oxathiazine 4-oxide, 4,5-dichloro-2-(n-octyl)-3(2H)-isothiazolone, 2,4,5,6-tetrachloroisophthalonitrile, tolylfluanid, dichlofluanid, diiodomethyl-p-tosylsulphone, capsciacin, N-cyclopropyl-N'-(1,1-dimethylethyl)-6-(methylthio)-1,3,5-triazine-2,4-diamine, 3-iodo-2-propynylbutyl carbamate, medetomidine, 1,4-dithiaanthraquinone-2,3-dicarbonitrile (dithianon), boranes such as pyridine triphenylborane, a 2-trihalogenomethyl-3-halogeno-4-cyano pyrrole derivative substituted in position 5 and optionally in position 1, such as 2-(p-chlorophenyl)-3-cyano-4-bromo-5-trifluoromethyl pyrrole (tralopyril), and a furanone, such as 3-butyl-5-(dibromomethylidene)-2(5H)-furanone, and mixtures thereof, macrocyclic lactones such as avermectins, for example avermectin B1, ivermectin, doramectin, abamectin, amamectin and selamectin, and quaternary ammonium salts such as didecyldimethylammonium chloride and an alkyldimethylbenzylammonium chloride.

If the fouling-resistant composition comprises biocide, we mean that the biocide is present within the body of the dried, cured or crosslinked coating layer (in the sense that it was mixed in the coating composition prior to drying, curing or crosslinking).

Optionally the fouling-resistant composition comprises other substances known to have a fouling-resistant effect, for example the fluorinated alkyl- or alkoxy-containing polymer or oligomer described in WO 02/074870.

The coating composition preferably has a solids content, defined as the weight percentage of involatile material in the coating composition, of 35 wt %, more preferably at least 50 wt %, even more preferably at least 70 wt %. The solids content can range up to 80 wt %, 90 wt %, 95 wt % and preferably up to 100 wt %. The solid content may be determined in accordance with ASTM method D2697.

The coating composition can be applied by normal techniques, such as brush, roller, or spray (airless and conventional). To achieve proper adhesion to the substrate it is preferred to apply the fouling-resistant coating composition to a primed substrate.

The primer can be any conventional primer/sealer coating system. Good results were found, in particular with respect to adhesion, when using a primer that comprises an acrylic siloxy-functional polymer, a solvent, a thixotropic agent, filler, and, optionally, a moisture scavenger. Such a primer is disclosed in WO 99/33927. It is also possible to apply the coating composition according to the present invention on a substrate containing an aged anti-fouling coating layer. Before the coating composition according to the present invention is applied to such an aged layer, this old layer is cleaned by high-pressure water washing to remove any fouling. The primer disclosed in WO 99/33927 can be used as a tie coat between the aged coating layer and the coating composition according to the present invention. After the coating has been dried, cured or crosslinked, it can be immersed immediately and gives immediate anti-fouling and fouling release protection. As indicated above, the coating composition according to the present invention has very good fouling-resistant and foul release properties. This makes these coating compositions very suitable for use as anti-fouling, non-fouling or fouling-resistant coatings for marine and aquaculture applications. The coating can be used for both dynamic and static structures, such as ship & boat hulls, buoys, drilling platforms, oil production rigs, a floating production storage and offloading vessel (FPSO), a floating storage and regasification unit (FSRU), a cooling water intake in a power plant, a fish net or a fish cage and pipes which are immersed in water.

The coating can be applied on any substrate that is used for these structures, such as metal, concrete, wood or fiber-reinforced resin.

In one embodiment, the present invention relates to a substrate or a structure coated with the fouling-resistant coating composition as herein described.

A further embodiment of the invention is to a method for inhibiting fouling of a substrate in an aquatic environment by applying the fouling-resistant composition described and claimed herein to a substrate and then locating the substrate in the aquatic environment.

A further embodiment of the invention is to the use of the fouling-resistant composition as described and claimed herein for inhibiting fouling on a substrate in an aquatic environment.

EXAMPLES

The invention will be elucidated with reference to the following examples.

Examples 1 to 5

Seven different coating compositions were prepared by mixing the components shown in Table 1.

Foul Release Testing (1)

The example coating compositions were applied by brush onto glass substrates primed with a suitable undercoat. The coated substrates were immersed in an environment in which marine fouling organisms can be grown. After a period of seven days the fouled substrates were placed in a flow tank. The velocity of water flow in tank was increased incrementally from zero to nineteen knots. The extent of fouling coverage of the coated substrates was recorded.

TABLE 2

|  | Flow Speed (Knots) | | | | | | |
|---|---|---|---|---|---|---|---|
|  | 0 | 2 | 3 | 4 | 5 | 9 | 17 |
|  | Fouling Coverage (%) | | | | | | |
| Standard - Example 1 (Fluoro polymer) | 98 | 78 | 62 | 38 | 16 | 12 | 4 |
| Example 2 (acetylated lanolin) | 93 | 10 | 0 | 0 | 0 | 0 | 0 |
| Comparative Example 3 (lanolin) | 97 | 89 | 63 | 52 | 12 | 1 | 0 |
| Example 4 (lanolin oil) | 92 | 3 | 0 | 0 | 0 | 0 | 0 |
| Comparative Example 5 (lanolin wax) | 100 | 98 | 88 | 79 | 50 | 36 | 18 |

TABLE 1

|  | Example 1* (g) | Example 2 (g) | Example 3 (g) | Example 4 (g) | Example 5* (g) | Example 6 (g) | Example 7 (g) |
|---|---|---|---|---|---|---|---|
| Hydroxy terminated silicone (8) | 60.00 | 60.00 | 60.00 | 60.00 | 60.00 | 60.00 | 60.00 |
| Hydrophobic silica (9) | 1.70 | 1.70 | 1.70 | 1.70 | 1.70 | 1.70 | 1.70 |
| Zeolite (10) | 0.36 | 0.36 | 0.36 | 0.36 | 0.36 | 0.36 | 0.36 |
| Titanium dioxide (11) | 5.32 | 5.32 | 5.32 | 5.32 | 5.32 | 5.32 | 5.32 |
| Black iron oxide (12) | 1.12 | 1.12 | 1.12 | 1.12 | 1.12 | 1.12 | 1.12 |
| Tetraethylorthosilicate | 2.71 | 2.71 | 2.71 | 2.71 | 2.71 | 2.71 | 2.71 |
| Xylene | 18.74 | 18.74 | 18.74 | 18.74 | 18.74 | 18.74 | 18.74 |
| Dioctyltin dilaurate | 0.48 | 0.48 | 0.48 | 0.48 | 0.48 | 0.48 | 0.48 |
| 2,4-Pentanedione | 4.34 | 4.34 | 4.34 | 4.34 | 4.34 | 4.34 | 4.34 |
| Fluoro polymer (1) | 5.23 |  |  |  |  |  |  |
| Acetylated Lanolin (2) |  | 5.23 |  |  |  |  |  |
| Lanolin (3) |  |  | 5.23 |  |  |  |  |
| Lanolin Oil (4) |  |  |  | 5.23 |  |  |  |
| Lanolin Wax (5) |  |  |  |  | 5.23 |  |  |
| Cholesterol (6) |  |  |  |  |  | 5.23 |  |
| Cholesterol Acetate (7) |  |  |  |  |  |  | 5.23 |

*Comparative Example
(1) E10-H (Solvay Solexis) ™
(2) Acetylated Lanolin Standard (NK Chemicals) ™.
(3) Anhydrous Lanolin TG (NK Chemicals) ™.
(4) Fluilan (Croda). The viscosity of this lanolin oil is 26 Poise at 25° C. using a Sheen viscomaster cone and plate viscometer.
(5) Argowax (Croda) ™.
(6) Cholesterol (Sigma-Aldrich) ™
(7) Cholesterol Acetate (Sigma-Aldrich) ™
(8) 3-0213 Polymer (Dow Corning) ™.
(9) Aerosil R972 (Evonik) ™
(10) Molsiv 5A (OMYA) ™
(11) Tioxide TR92 (Huntsman) ™
(12) Bayferrox 318M (Lanxess) ™.

In all cases, as the flow speed increased, the extent of fouling coverage deceased, as would be expected with a fouling-resistant composition.

The comparative fouling-resistant example comprising a flouro-polymer was chosen because it is described in WO 02/074870 as being a fouling-resistant composition with superior fouling-resistant properties compared to other known compositions.

These results show that the compositions comprising acetylated lanolin and lanolin oil (Examples 2 and 4) has superior fouling resistance when compared to compositions comprising unmodified lanolin, lanolin wax or the fluoro polymer at all flow speeds.

Foul Release Testing (2)

Coating compositions of examples 1 and 2 were applied by roller to a suitably undercoated boat hull located in Hartlepool Marina, UK. This marina is known for its weed, slime, hard-bodied and soft-bodied animal fouling. After ten months the boat was inspected and the extent of fouling observed on the areas coated with example 2 were less than on those coated with example 1.

| Patch location on boat | Slime Fouling (%) | Weed Fouling (%) | Soft Fouling (%) | Hard Fouling (%) | Total Fouling (%) |
|---|---|---|---|---|---|
| Standard Example 1 (Fluoro polymer) | Port | 43.9 | 0.0 | 2.7 | 3.0 | 49.6 |
| Standard Example 1 (Fluoro polymer) | Starboard | 45.6 | 0.0 | 3.0 | 4.2 | 52.8 |
| Example 2 (acetylated lanolin) | Port | 36.7 | 0.0 | 1.7 | 2.0 | 40.4 |
| Example 2 (acetylated lanolin) | Starboard | 34.3 | 0.0 | 4.7 | 4.0 | 43.0 |

These results show that the composition comprising acetylated lanolin has very good foul release performance, when applied to an active pleasure craft vessel. The composition comprising acetylated lanolin has better overall total fouling-resistance performance than the leading commercial composition (standard) comprising fluoropolymer.

Foul Release Testing (3)

The example coating compositions were applied by brush onto wood substrates primed with a suitable undercoat. The coated substrates were immersed in two marine environments where marine fouling (slime, weed, soft-bodied and hard-bodied animal fouling) in known to occur (Burnham-upon-Crouch, UK, and Changi, Singapore). The coated substrates were assessed periodically and the extent of fouling coverage recorded.

| Location 1: Burnham-upon-Crouch, UK | | | | |
|---|---|---|---|---|
| | Weeks since immersion | | | |
| | 0 | 9 | 14 | 39 |
| | Fouling Coverage (%) | | | |
| Example 2 (acetylated lanolin) | 0 | 40 | 43 | 66 |
| Example 2 (cholesterol) | 0 | 51 | 54 | 72 |
| Example 3 (cholesterol acetate) | 0 | 35 | 38 | 60 |

| Location 2: Changi, Singapore | | | | |
|---|---|---|---|---|
| | Weeks since immersion | | | |
| | 0 | 6 | 23 | 32 |
| | Fouling Coverage (%) | | | |
| Example 1 (acetylated lanolin) | 0 | 37 | 50 | 55 |
| Example 6 (cholesterol) | 0 | 62 | 69 | 71 |
| Example 7 (cholesterol acetate) | 0 | 54 | 58 | 63 |

In both locations, after several months all 3 coatings displayed good fouling resistance. The results show a particularly excellent fouling resistance when the coating contained a component comprising sterols which had been acetylated (Examples 1 and 7).

The invention claimed is:

1. A fouling-resistant coating composition comprising a crosslinkable elastomer, an organic solvent, and a component selected from the group consisting of acylated lanolin, alkoxylated lanolin and lanolin oil, wherein the elastomer is a polymer comprising a repeating unit of the general structure —[SiR$^1$R$^2$—O]—, wherein R$^1$ and R$^2$ are independently selected from the group consisting of a hydrogen, an alkyl group, an aryl group, an aralkyl group and a vinyl group.

2. The fouling-resistant coating composition of claim 1, wherein the acylated lanolin is $C_1$-$C_{12}$ acylated lanolin.

3. The fouling-resistant coating composition of claim 1, wherein the acylated lanolin is acetylated lanolin.

4. The fouling-resistant coating composition of claim 1, wherein the weight ratio of the component to the elastomer is about 1-30%.

5. The fouling-resistant coating composition of claim 2, wherein the weight ratio of the component to the elastomer is about 1-30%.

6. The fouling-resistant coating composition of claim 3, wherein the weight ratio of the component to the elastomer is about 1-30%.

7. The fouling-resistant coating composition of claim 1, wherein the elastomer is a mixture of organosiloxane polymer(s).

8. The fouling-resistant coating composition of claim 3, wherein the elastomer is a mixture of organosiloxane polymer(s).

9. The fouling-resistant coating composition of claim 4, wherein the elastomer is a mixture of organosiloxane polymer(s).

10. The fouling-resistant coating composition of claim 1, wherein R$^1$ and R$^2$ are independently selected from the group consisting of methyl and phenyl.

11. The fouling-resistant coating composition of claim 1, wherein R$^1$ and R$^2$ are methyl.

12. A method for inhibiting fouling of a substrate in an aquatic environment, the method comprising applying a fouling-resistant coating composition to the substrate, and then immersing the substrate in the aquatic environment;
wherein the fouling-resistant coating composition comprises an elastomer, an organic solvent, and a component selected from the group consisting of acylated lanolin, alkoxylated lanolin and lanolin oil, wherein the elastomer is a polymer comprising a repeating unit of the general structure —[SiR$^1$R$^2$—O]—, wherein R$^1$ and R$^2$ are independently selected from the group consisting of a hydrogen, an alkyl group, an aryl group, an aralkyl group and a vinyl group.

13. A substrate comprising a substrate coated with the fouling-resistant coating composition of claim 1.

\* \* \* \* \*